United States Patent
Danielsson et al.

(10) Patent No.: US 11,024,039 B2
(45) Date of Patent: Jun. 1, 2021

(54) METHOD AND DEVICE FOR TRACKING AN OBJECT

(71) Applicant: Axis AB, Lund (SE)

(72) Inventors: Niclas Danielsson, Lund (SE); Markus Skans, Lund (SE)

(73) Assignee: AXIS AB, Lund (SE)

(*) Notice: Subject to any disclaimer, the term of this patent is extended or adjusted under 35 U.S.C. 154(b) by 0 days.

(21) Appl. No.: 16/686,240

(22) Filed: Nov. 18, 2019

(65) Prior Publication Data
US 2020/0193619 A1 Jun. 18, 2020

(30) Foreign Application Priority Data
Dec. 13, 2018 (EP) .................................. 18212206

(51) Int. Cl.
*G06T 7/246* (2017.01)
*G06T 7/292* (2017.01)
(Continued)

(52) U.S. Cl.
CPC .......... *G06T 7/248* (2017.01); *G06K 9/00369* (2013.01); *G06K 9/6215* (2013.01); *G06K 9/6288* (2013.01); *G06T 7/292* (2017.01); *G06T 7/73* (2017.01); *H04N 5/247* (2013.01); *H04N 7/181* (2013.01); *G06T 2207/10016* (2013.01); *G06T 2207/10028* (2013.01); *G06T 2207/30196* (2013.01); *G06T 2207/30232* (2013.01)

(58) Field of Classification Search
CPC ............. G06T 7/73; G06T 2207/10016; G06T 2207/10028; G06T 2207/30196; G06T 2207/30232; G06K 9/00369; G06K 9/6288; G06K 9/00288
See application file for complete search history.

(56) References Cited

U.S. PATENT DOCUMENTS 7,436,887 B2 * 10/2008 Yeredor ............. G06K 9/00771
375/240.01
7,606,425 B2 * 10/2009 Bazakos ............. G06K 9/00335
348/143
(Continued)

FOREIGN PATENT DOCUMENTS

WO 2016/131300 A1 8/2016

OTHER PUBLICATIONS

Baltieri, D., et al., "Mapping Appearance Descriptors on 3D Body Models for People Re-identification," International Journal of Computer Vision, vol. 111, No. 3, Springer, New York, Jul. 22, 2014, pp. 345-364.
(Continued)

*Primary Examiner* — Brian P Yenke
(74) *Attorney, Agent, or Firm* — Xsensus LLP (57) ABSTRACT

In a method for tracking an object in video-monitoring scenes, multiple feature vectors are extracted (722) and assembled (724) in point clouds, wherein a point cloud may be assembled for each tracklet, i.e. for each separate part of a track. In order to determine if different tracklets relate to the same or different objects the point clouds of each tracklet is compared (734). Based on the outcome of the comparison it is deduced if the first object and the second object may be considered to be the same object and, if so, the first object is associated (738) with the second object.

15 Claims, 4 Drawing Sheets

(51) Int. Cl.
*G06T 7/73* (2017.01)
*G06K 9/00* (2006.01)
*G06K 9/62* (2006.01)
*H04N 5/247* (2006.01)
*H04N 7/18* (2006.01)

(56) References Cited

U.S. PATENT DOCUMENTS

| | | | | |
|---|---|---|---|---|
| 8,279,286 | B2* | 10/2012 | Wagg | G06K 9/00369 |
| | | | | 348/169 |
| 8,285,060 | B2* | 10/2012 | Cobb | G06K 9/00335 |
| | | | | 352/52 |
| 8,472,714 | B2* | 6/2013 | Brogren | G06K 9/00369 |
| | | | | 382/100 |
| 8,478,040 | B2* | 7/2013 | Brogren | G06K 9/00369 |
| | | | | 348/159 |
| 9,589,181 | B2* | 3/2017 | Ito | G06K 9/00288 |
| 9,635,237 | B2* | 4/2017 | Kannermark | H04N 5/23212 |
| 10,025,950 | B1 | 7/2018 | Avasarala | G06K 9/00281 |
| 10,152,645 | B2* | 12/2018 | Baltsen | G06K 9/00718 |
| 10,445,599 | B1* | 10/2019 | Hicks | G05D 1/0246 |
| 10,489,916 | B2* | 11/2019 | Baltsen | G06K 9/6202 |
| 10,496,903 | B2* | 12/2019 | Danielsson | G06K 9/66 |
| 10,621,444 | B1* | 4/2020 | Mirza | G06K 9/00342 |
| 10,635,936 | B2* | 4/2020 | Tullberg | G06K 9/6227 |
| 2006/0053342 | A1* | 3/2006 | Bazakos | G08B 21/0423 |
| | | | | 714/37 |
| 2008/0166045 | A1* | 7/2008 | Xu | G06T 7/251 |
| | | | | 382/170 |
| 2008/0181453 | A1* | 7/2008 | Xu | G06T 7/277 |
| | | | | 382/103 |
| 2009/0002489 | A1* | 1/2009 | Yang | G06K 9/621 |
| | | | | 348/143 |
| 2009/0059007 | A1* | 3/2009 | Wagg | G06K 9/00711 |
| | | | | 348/157 |
| 2012/0020518 | A1* | 1/2012 | Taguchi | G06T 7/292 |
| | | | | 382/103 |
| 2014/0334676 | A1* | 11/2014 | Skans | G08B 13/19686 |
| | | | | 382/103 |
| 2014/0368493 | A1* | 12/2014 | Rogan | G06K 9/00201 |
| | | | | 345/419 |
| 2016/0343146 | A1 | 11/2016 | Brown et al. | |
| 2017/0098323 | A1* | 4/2017 | Rogan | G01S 7/4802 |
| 2018/0012078 | A1* | 1/2018 | Pournaghi | G06T 7/50 |
| 2018/0107880 | A1* | 4/2018 | Danielsson | G06K 9/00288 |
| 2018/0137362 | A1* | 5/2018 | Danielsson | G06K 9/685 |
| 2018/0165546 | A1* | 6/2018 | Skans | G06K 9/6234 |
| 2018/0203460 | A1* | 7/2018 | Joho | G06K 9/00664 |
| 2018/0357789 | A1* | 12/2018 | Yang | G06T 7/74 |
| 2019/0258878 | A1* | 8/2019 | Koivisto | G06K 9/3241 |
| 2019/0387185 | A1* | 12/2019 | Hicks | H04N 5/33 |
| 2020/0019921 | A1* | 1/2020 | Buibas | H04N 5/247 |

OTHER PUBLICATIONS

Munaro, M., et al., "3D Reconstruction of Freely Moving Persons for Re-Identification with a Depth Sensor," 2014 IEEE International Conference on Robotics & Automation (ICRA), Hong Kong, China, May 31 to Jun. 7, 2014, pp. 4512-4519.

Bondi, E., et al., "Long Term Person Re-Identification from Depth Cameras using Facial and Skeleton Data," Understanding Human Activities Through 3D Sensors, vol. 10188, Springer International Publishing, 2016, pp. 29-41.

Aziz, K-E., et al., "People re-identification across multiple non-overlapping cameras system by appearance classification and silhouette part segmentation," 8th IEEE International Conference on Advanced Video and Signal Based Surveillance, IEEE, Aug. 30, 2011, pp. 303-308.

Schumann, A., and Monari, E., "A soft-biometrics dataset for person tracking and re-identification," 11th IEEE International Conference on Advanced Video and Signal Based Surveillance, IEEE, Aug. 26-29, 2014, pp. 193-198.

Chen, X., et al., "Object Tracking across Non-overlapping Cameras Using Adaptive Models," Asian Conference on Computer Vision, vol. 7729, Springer, 2012, pp. 464-477.

Jiang, X., et al., "Multi-person Tracking-by-Detection Based on Calibrated Multi-camera Systems," International Conference on Computer Vision and Graphics, ICCVG 2012: Computer Vision and Graphics, vol. 7594, Springer-Verlag Berlin Heidelberg 2012, Sep. 24-26, 2012 pp. 743-751.

Wang, T., et al., "Person Re-identification by Video Ranking," European Conference on Computer Vision, ECCV 2014: Computer Vision—ECCV 2014, vol. 8692, Springer International Publishing Switzerland 2014, Sep. 6-12, 2014, pp. 688-703.

McKenna, S. J., et al., "Tracking Groups of People," Computer Vision and Image Understanding, vol. 80, No. 1, Oct. 2000, 15 pages.

Corvee, E., et al., "People detection and re-identification for multi surveillance cameras," VISAPP—International Conference on Computer Vision Theory and Applications—2012, HAL—Inria, Rome, Italy, Feb. 24, 2012, 8 pages.

Ristani, E., and Tomasi, C., et al., "Features for Multi-Target Multi-Camera Tracking and Re-Identification," The IEEE Conference on Computer Vision and Pattern Recognition (CVPR), Jun. 18-22, 2018, 11 pages.

Luiten, J., et al., "PReMVOS: Proposal-generation, Refinement and Merging for Video Object Segmentation," Asian Conference on Computer Vision, vol. 11364, 2018, pp. 565-580.

Li, X., and Loy, C. C., "Video Object Segmentation with Joint Re-identification and Attention-Aware Mask Propagation," The European Conference on Computer Vision (ECCV), vol. 11207, 2018, 10 pages.

Andriluka, M., et al., "People-Tracking-by-Detection and People-Detection-by-Tracking," 2008 IEEE Conference on Computer Vision and Pattern Recognition, IEEE, Jun. 23-28, 2008, 8 pages.

* cited by examiner

METHOD AND DEVICE FOR TRACKING AN OBJECT

CROSS-REFERENCE TO RELATED APPLICATION

The present application claims priority to EP 18212206.9, filed Dec. 13, 2018, the entire contents of which are incorporated herein by reference.

TECHNICAL FIELD

The present invention relates to tracking of objects in video, and in particular to recovery of tracking of an object following an occlusion incident or another incident where an object disappears from a camera view, fully or partly, for a longer or shorter time period.

BACKGROUND

The use of object re-identification is well known in the field of video surveillance, or more broadly, in the field of analysis of video data. In particular re-identification is applicable during tracking of an individual. During tracking in one and the same scene a tracked individual could be fully or partly occluded by another person, or a constructional detail etc., during a limited amount of time. If a human operator monitors the scene and the tracking is performed manually this type of occlusion is not a problem, since the operator will readily be able to find the individual again following the occlusion.

When use is made of computer vision, however, the situation is a bit more complex. For a tracking algorithm, the occlusion results in that the individual disappears from view, and the tracking is ended, or rather, it results in that the tracking algorithm no longer has enough data to track the individual. When the individual appears again, for example on another side of an occluding item, the algorithm will identify it as a new object, and a new tracking sequence will be initiated.

Although tracking of individuals is the example presented above, any discernible object may be tracked, be it a person, a rabbit, a car, etc.

It is readily understood that full or partial occlusion occurs frequently in monitoring situations, and various techniques for re-identification have therefore been developed. If the object, for instance an individual, can be identified following an occlusion event as being the same object as prior to the occlusion event, the object and track identified following the occlusion can be labelled as being one and the same as the corresponding object and track recorded before the occlusion. Following such re-identification an identifier of the object and/or the track before and after the occlusion may be set as one and the same. The object and/or the track may of course be coupled in other ways than a straightforward merge of identifiers. In this context it may be clarified that the "track" is the path that the object has followed. Data concerning the track may correspond to each position in which the tracking algorithm has detected the object, in combination with the time stamp. The track may or may not be visualized to a user, as the video is displayed, yet the data is usually logged.

Techniques where the actual track is used include methods where a present track up to the occlusion event is extrapolated so as to enable a filtering of new tracks as they appear following the occlusion. Also, various descriptors or feature vectors used for characterisation of an object or individual may be used. If the feature vector of a disappearing object is similar enough to the feature vector of a new object that appears in the scene, it may be likely that the object is one and the same. These two techniques may be trivially combined.

It should be noted that the present invention may be used for track recovery during full or partial occlusion, yet it may also be used for object having disappeared for a longer time than what is usually implied by the word "occlusion" in the present field, as well as for situations where an object disappears from a first camera view and re-appears in a second camera view. This will be exemplified in the detailed description.

Some more background and examples of the above is disclosed in the article "Mapping Appearance Descriptors on 3D Body Models for People Re-identification" (Int. J. Comput. Vis. [2015] 111:345-364). In the cited document, the take is to improve re-identification by refining an appearance descriptor for the object being tracked, and more particularly to utilize a 3D body model.

SUMMARY OF THE INVENTION

An object of the invention is to solve the problems mentioned above, in providing a new method for tracking an object in scenes being video monitored. Such a method for tracking an object in video-monitoring scenes, comprises a number of steps:

Detecting a first object in a scene, tracking the first object over a first sequence of image frames, acquiring first feature data in the form of multiple first feature vectors for the first object, assembling the multiple first feature vectors as a first point cloud in a feature vector space, and detecting an occlusion of the first object. These first steps essentially correspond to the first half of the method, and it should be noted that the steps do not necessarily have to be performed in the stated order. For instance, the detection of occlusion could take place prior to the multiple first feature vectors being assembled as a first point cloud.

Furthermore, the step of detecting an occlusion more often than not corresponds to that a tracking algorithm loses the track of an object as a result of insufficient data available for tracking. At that time, the occlusion can be said to have been detected.

The method further comprises detecting a second object subsequently appearing in a scene, tracking the second object over a second sequence of image frames, acquiring second feature data in the form of multiple second feature vectors for the second object, assembling the multiple second feature vectors as a second point cloud in the feature vector space, and comparing at least a selected portion of the first point cloud to at least a selected portion of the second point cloud in the point cloud space. The outcome of the comparison is used to deduce if the first object and the second object may be considered to be the same object and, if so, associating the first object with the second object and in particular the respective track thereof into. The outcome consequently enables a track recovery, where a first track lost may be recovered in the form of a second track. Furthermore, the identity of the second object may be set to the identity of the first object, or vice versa, directly in the tracking algorithm, or associated in another way, e.g. in a separate directory mapping objects. As mentioned before, the order of steps may differ from the above, e.g. the comparison may be initiated prior to the second point cloud is formed, or at least fully formed.

The inventive method will enable a dynamic comparison between the feature vectors emanating from different occurrences of objects. Entire point clouds may be compared, yet selection of portions within such point clouds may also be used. If the first object is associated with the second, the consequence may be that they are given the same object ID, e.g. the object ID for the second object may be cancelled and replaced by the ID for the first one. In this context an object ID is one of the parameters generated in most object trackers. Other parameters that are commonly generated are a measure of object position, and some measure of object size. Each newly detected object is given an object ID, so before the comparison is made the first and second appearance of the same object may be given different object ID:s. Each image frame is a potential source for extracting one or more feature vectors, and since common frame speeds are 30 or 60 frames per second, a point cloud may contain representation of a large number of feature vectors.

In one or more embodiments the one or both selections of portion to be used for comparison is based on an occlusion period, the occlusion period being a time elapsed between the occlusion of the first object and the appearance of the second object. The term occlusion is mentioned in several places of the present application, and within the context of tracking it often refers to a point in time where the presently used tracking algorithm is no longer able to track the object, often due to lack of image information when the object has been fully or partly occluded, e.g. by another object. So, occlusion could correspond to a full or partial object disappearance from a camera view. In an analogous way an object is considered to have appeared (or re-appeared) when there is enough information for the tracking algorithm to see the object again. Notably, prior to comparison it is not possible to say whether the second object appearing is identical to the first object that has disappeared until this is verified. Still, the occlusion period may be used as a parameter when deciding which part of the point clouds that should be used when a comparison is made. Notably, when assigning a value to the occlusion period it is assumed that the second object that reappears is the same as the first object that disappeared earlier. This may later prove to be an incorrect assumption (see the example of FIG. 1 as described in the detailed description), yet for the purposes of controlling the selection of the portion to be used for comparison the assumption is valid. This is further described in the detailed description, yet in one related embodiment the occlusion period will affect a distribution of statistical weights given to each individual feature vector in the one or both selections. For instance, shorter occlusion periods may shift higher weights to feature vectors acquired closer to the occlusion period, compared to longer occlusion periods where other distribution of weights may be used. This means, in a simplified embodiment, that the features of the object immediately prior to the occlusion is compared to the features of an object immediately following the re-appearance of the object. The reasoning is that the features of the object, as well as the external conditions (such as lighting), are likely to be similar for shorter occlusion periods. For longer occlusion periods other selections may be used.

In a coupled embodiment, the selection of which portion of a point cloud that is to be used for comparison is based, fully or partly, on a pose of the tracked object associated with the point cloud. This embodiment may be particularly relevant for tracking of individuals. The assembled point clouds are particularly well suited to be used as collections from which any existing parameter may be used for making a selection, and it is likely that using feature vectors emanating from the same pose (for the same individual) are likely to be more similar than if different (or random) poses are used. A neighbouring technique of making a defined selection is to allow for the poses to determine a weight used in comparison, thus corresponding to a "softer" selection, so that each acquired feature vector is provided with a weight, and wherein the weight is affected by the pose of the object, thereby enhancing the desired poses while still maintaining some input from other poses.

An assembled point cloud enables correlated evaluations where a certain pose is found to result in a particularly well-defined portion of the point cloud, enabling that portion to be selected for comparison, or to be given a greater weight.

In one or more embodiments a selection of a portion of the point cloud to be used for comparison is made from a parameter selected from the group comprising, in an image area of the first or second object: a level of motion blur, a level of signal to noise ratio, the lighting conditions, and a viewing angle of the tracked object or combinations thereof. The basic idea is to compare feature vectors that are likely to be similar (if the object is the same), and by using one of the presented parameters as selectors the chances of such similarity is increased. Furthermore, the image area referred to includes the object and a small area around the object, and in the most likely approach the area will correspond to an area used by the tracking algorithm, since this is readily available. However, the size of the area could be larger in some applications, and it could also be restricted to the actual object or even a portion of the object. To use either parameter as a selector implies that the particular parameter should be similar (within a predetermined threshold) for a feature vector to be selected from the point cloud.

In one or more embodiments one or more of the point clouds are evaluated so as to identify a portion of each point cloud having a particularly dense concentration of feature vectors, since such a dense concentration may provide excellent statistics. What is considered to be "particularly dense" may be defined in relation to a predetermined threshold, yet it may also be determined based on a statistical analysis of the particular point cloud, such that the concentration is dense in comparison to other portions of the point cloud. In an embodiment where a particular portion is selected in a first point cloud, the corresponding portion may be used in point cloud to which the first point cloud is compared, so that the comparison is not distorted. In other embodiment this approach is not used.

When comparing the first point cloud to the second, a measure such as the Euclidian distance may be used. In the same or other embodiments, the first point cloud may be compared to the second point cloud in a manifold of the point cloud space where the first point cloud and the second point cloud reside (or at least the point cloud portions used for comparison).

In one or more embodiments, the first point cloud may be acquired using a first monitoring camera, whereas the second point cloud may be acquired using a second monitoring camera, while in other embodiments the same camera is used.

According to another concept the present invention relates to a device comprising at least one video-imaging unit for acquiring video images of a scene, and a control unit configured to perform the steps of the method for performing the method of an embodiment described in the specification. In one or more embodiments the device is a video monitoring camera, while in another embodiment the device is a system of video monitoring cameras. In this latter embodiment the control unit may be a control unit of one of the video monitoring cameras or be a centralized control unit located as a separate device, on a server, or on a client device remote from the video monitoring cameras.

According to a third aspect, the present invention relates to a computer-readable medium comprising instructions which, when executed by a computer, cause the computer to carry out the method according to one or any embodiments disclosed.

A further scope of applicability of the present disclosure will become apparent from the detailed description given below. However, it should be understood that the detailed description and specific examples, while indicating preferred variants of the present inventive concept, are given by way of illustration only, since various changes and modifications within the scope of the inventive concept will become apparent to those skilled in the art from this detailed description.

Hence, it is to be understood that this inventive concept is not limited to the particular steps of the methods described or component parts of the systems described as such method and system may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The invention will now be described in more detail by way of example and with reference to the accompanying schematic drawings, in which.

DETAILED DESCRIPTION OF EMBODIMENTS

Figure 1:
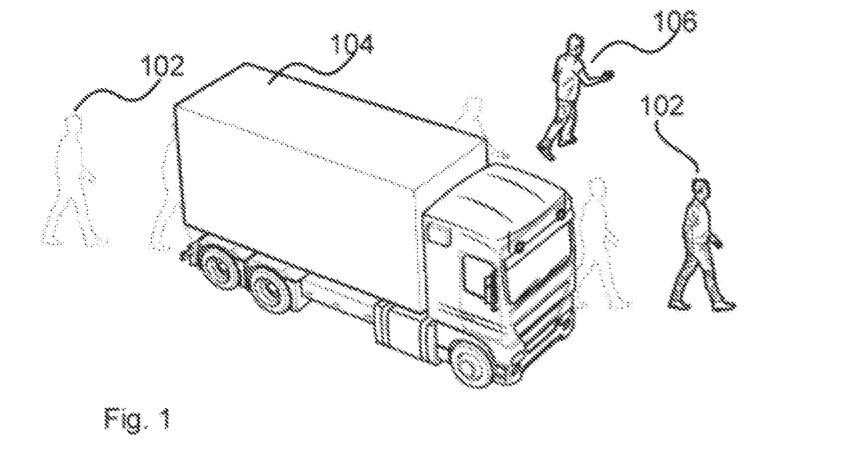
FIG. 1 is a schematic view of a scene being monitored.

FIG. 1 illustrates, in a time condensed manner, a scene being surveilled by a monitoring camera. The figure represents a course of events during a period of time, as indicated by the multiple appearances of the same object, and it will be described in the following. A first person 102 enters the scene to the left and walks to the right (in the imaged scene). At a point in time and in the scene this first person 102 is occluded by a truck 104, which either is parked or moves through the scene. The first person 102 is occluded for a while, and subsequently emerges on the right side (as seen from the camera) of the truck 104. At approximately the same time, or at least subsequently to the first person 102 being occluded, a second person 106 appears from behind (as seen from the camera) the truck 104. The scene is simplified, but it may be used to introduce the present invention, according to one embodiment thereof. It is appreciated that FIG. 1 is represented by several images captured as a video sequence by the monitoring camera.

A tracking algorithm, or any object detector, would readily detect three isolated moving objects in the imaged scene (possibly four if the truck is moving through the scene), at different times. Each object will follow a track or tracklet (as detected by the tracking algorithm), and there will be a challenge in concluding that two of these objects are actually the same (if that is the case), and that the third is not. In some instances, a timeline may be used with success, since one single object cannot be in two places at once. In other instances, a Kalman filter may be used with success, provided that the motion of the object (the first person 102) is readily predictable from its motion in previously captured frames and that the occlusion period is limited. For longer occlusion periods, or if the object moves in an unpredictable fashion when occluded, use of a Kalman filter will have a low success rate for re-identification. In conclusion, neither of these approaches are likely to be successful since both the appearance of the second object (the second person 104) and the second appearance of the first object (the first person 102) occur following the occlusion of the first object, resulting in that both are potential candidates for being the first object. Moreover, the motion of the first object is not readily predictable.

According to this first embodiment of the present invention feature vectors are extracted from each detected moving object continuously. This may be done for every single image frame in the video sequence captured by the monitoring camera, yet the frequency of the acquisition of feature vectors may also be lower than the frequency of acquisition of image frames (i.e. lower than the actual number of frames per second (fps) in the captured video sequence). Instead of having a fixed frequency, the acquisition may be based on the content of the image, i.e. a feature vector will be extracted only if the content of the image fulfills one or more criteria. In one or more embodiments the evaluation of feature vectors of a detected object may also, in addition to other evaluations, be made using a neural network evaluating features such as gait or motion pattern apart from more physical attributes of the object such as pose, so that such features may be added to the identification process.

It should also be pointed out that in this embodiment, as in any embodiment of the present invention, several feature vectors may be extracted from a single view of the same object. As a simple example, one feature vector may be extracted for the face or head of an individual, while another is extracted for the full body. In this sense several point clouds of different feature vectors may be gradually assembled in parallel, in the same or in different vector spaces. For a subsequent comparison to be meaningful the compared point clouds should reside in the same vector space.

A feature vector, or an appearance vector, is a descriptor of an object, or of an image containing an object. The feature vector may be a semantic description (person, red shirt, bag, etc.) but in the present context it is more often than not a numerical descriptor extracted by means of applying algorithms for computer vision, machine learning, or neural networks, or a combination thereof, to an image selection comprising the object in question. The extraction of a feature vector may be preceded by a cropping (or feature selection) procedure, so that a resulting image crop evaluated consists of, to the highest possible degree, the object of interest. This object may be a person, but it may also be the face of a person, as well as any other distinguishable object or part thereof. Further to this, a feature vector may include temporally resolved information rather than only parameters relating to physical appearance. In this way, in the context of FIG. 1, the velocity of a person may be accounted for, or even the gait of the person, e.g. by use of a recurrent neural network (RNN). Furthermore, each feature vector may comprise implicitly encoded information, such as information regarding a time stamp, and general information regarding the analysed object, such as the present pose. Consequently, it is possible to use the implicitly encoded information for the purpose of filtering and/or selecting particular feature vectors or a group of feature vectors.

The extraction of feature vectors as such is in fact not a part of the present invention in the sense that the invention adds to the field of feature extraction as such. The use of feature extraction is relied upon for the purposes of the present invention, and while not any and every feature extraction algorithm may be suitable for use with the present invention, the use of feature extraction algorithms should be considered straightforward for a person skilled in the art. The extraction of feature vectors, or appearance vectors, is a living field of research that evolves with evolution in image processing, neural networks and with the increasing computational power available. For the purposes of the present invention many different approaches for feature vector extraction may be utilized.

Figure 2:
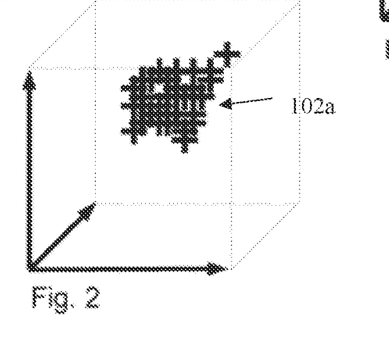
FIGS. 2-4 are schematic diagrams illustrating an intermediate result during tracking of objects in a scene.

A feature vector is generally multidimensional, and a numerical vector may have tens, hundreds or even thousands of parameters, corresponding to the same number of dimensions. For the purposes of facilitating the understanding of the description to follow, the number of dimensions has been reduced to three. FIG. 2 illustrates a point cloud 102*a* of feature vectors extracted for the first person 102, up to the point in time where the person is occluded and lost to the tracking algorithm, i.e. for the first part of the persons track. In a monitoring video sequence this first portion of the track may correspond to thousands of image frames, and there may be one feature vector extracted for each frame. In other embodiments feature vectors are extracted at predetermined time intervals, or for image frames fulfilling certain criteria (e.g. below a certain level of motion blur, above a certain level of signal to noise, etc.). In still further embodiments the extraction may be governed by a desire to evaluate feature vectors from as many directions of the object as possible, or from a particularly favoured direction, an embodiment which of course may be combined with any of the other embodiments and examples.

The feature vectors may readily be associated with the same object due to the tracking of that same object, and they are sequentially added to a memory. Once the object is occluded the addition of feature vectors to the memory is finalized. The memory could be located on the camera acquiring the video, or on the device performing the feature extraction, yet it could equally well be located at another server or in the point cloud. Furthermore, the feature vectors may be stored at more than one location, if such an approach is considered suitable. The feature vectors (predominantly each feature vector) will comprise a time stamp so that it may be associated with a particular image frame at a later stage if so desired. An image crop including the tracked object may be stored for later review, yet this is rarely necessary unless there is a step of active learning of a neural network, which is not a part of the present invention.

Figure 8:
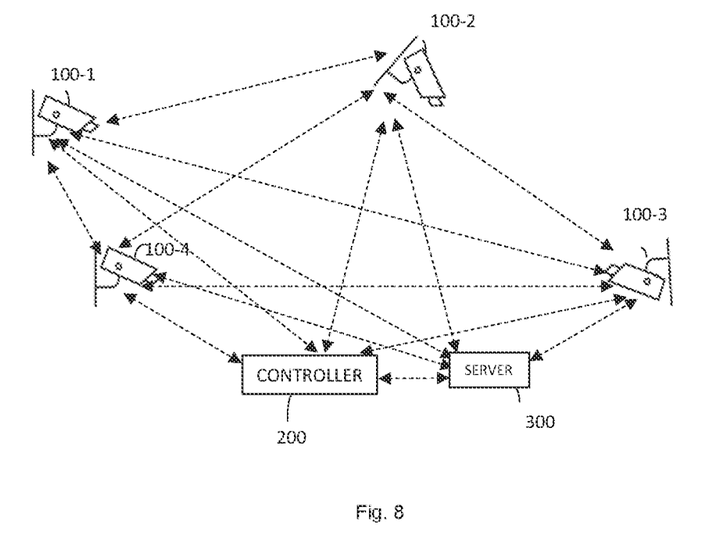
FIG. 8 is a system according to an embodiment.

A camera 100-1, or a controller 200 for a camera (or a client or client server 300) see FIG. 8), may transmit direct requests concerning feature vectors to the storage of other monitoring cameras 100-2 to 100-4 when trying to find earlier (or later) images of the same object. This may be done by accessing all available data, yet if the topology (e.g. the location) of other monitoring cameras is known, such information may be used to make the evaluation more efficient, an example being that information from nearby cameras is evaluated first. Notably, this relates more to the issue of what data to evaluate than to the evaluation as such, and consequently it is not intimately related to the present invention, although it may be an important issue to ponder on when evaluation large amounts of data.

Figure 3:
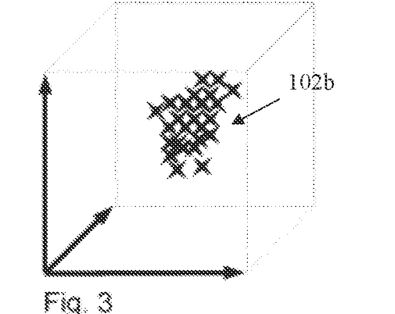
Figure 4:
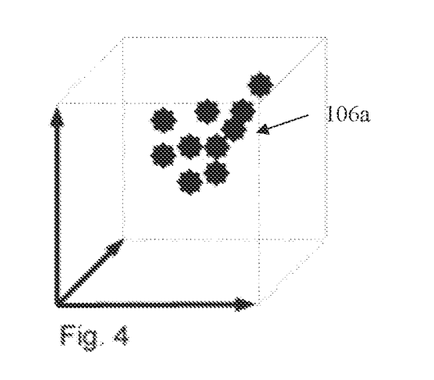

When a new object appears, the same procedure for extracting feature vectors is initiated for that new object. The second object, the second person 106 in this case, appearing in FIG. 1 results in a feature vector point cloud 106*a* as shown in FIG. 3, and when the first object 102 makes its second appearance it may result in a feature vector point cloud 102*b* as shown in FIG. 4.

As a new object appears it is paramount, at least in a tracking situation or a re-identification situation, to determine whether that object has appeared before in the same or other scenes, in this first embodiment of the present invention this is executed by comparing the feature vector point clouds. The differences and similarities have been exaggerated in FIGS. 2-4, meaning that it is possible to visually confirm that FIG. 2 is a feature vector point cloud 102*a* extracted that very well could have been extracted from the same object as the cloud 102*b* illustrated in FIG. 4, while the object leading to the feature vector point cloud 106*a* of FIG. 3 most probably is not the result of the same object. Consequently, the second appearance of the first object 102 may be determined to be just that, and the tracks and object identities may be combined to one, and by that a track recovery has been successfully accomplished.

Before continuing with further detailed embodiments, it is noted that the comparison of aggregations of data amounts, such as the point clouds of feature vectors, may be done with established techniques. Parameters to be compared may be the shape of the point clouds, statistical features of the point clouds, Euclidian distance between portions of the point clouds, distance as measured in an alternative manifold in which the entire or portions of the point clouds resides. Another example of a distance measure that can be used in the comparison is Mahalanobis distance, which is both unitless and scale invariant.

In a further embodiment the recording of a point cloud is put into use in another respect. In this particular embodiment the time during which an object has been occluded, the occlusion period, may be added as a parameter when evaluating and comparing point clouds. The occlusion period is the time between the disappearance of an object (i.e. detection of occlusion) and the re of the object (i.e. detection of potentially the same object). Notably, during application of the present invention several possible objects may be present at the same time, and there may be several candidates to which is the second (or thirds etc.) appearance of an object that has been tracked previously. In embodiments where each feature vector includes a time stamp the problem is trivially solved by comparing the time stamp of the last feature vector of a tracklet with the time stamp of the first feature vector in another tracklet, a tracklet being a fragment of a full track. Returning to the use of the occlusion period, it may in particular affect the weight given to individual points (i.e. feature vectors) in the point cloud. In a situation where the occlusion period is short, in the order of a few seconds or fractions of a second, individual points closer to the time of disappearance and appearance will be given a greater weight than individual points farther away from the same. On the other hand, if the occlusion period is longer, such as several minutes, hours, or even days, the weight given to individual points may be less diverse due to this parameter. The typical meaning of "occlusion" within the present field is a full or partial disappearance of an object for a limited amount of time. While this is the case, the embodiments as described relating to occlusion may applied to embodiments relating to a longer disappearance of an object, such as if the object enters a building in a single scene, and exits the building at a later stage (after a couple of minutes or even after a working day), or in embodiments where an object disappears from the view of a first camera and appears in a second (or other) camera.

When only a portion of a point cloud is used in a comparison this may be done in several different ways, all possible due to the dedicated collection of data. The example of using the occlusion period has been given, and in particular this embodiment is relevant for short occlusion periods, where, at least hypothetically, the appearance of the object at the time just before occlusion is very similar to the appearance immediately following occlusion. In such an embodiment it is reasonable to use a greater weight for feature vectors extracted closer to the time of occlusion than further away thereof. Some examples include a straightforward weighted moving average (i.e. an average that has multiplying factors to give different weights to data at different positions in the sample window) or an exponential weighted moving average (i.e. a first-order infinite impulse response filter that applies weighting factors which decrease exponentially, the weighting for each older datum decreases exponentially, never reaching zero). These are merely some examples, there are several other alternatives of well-known weight functions that my be preferable for a particular situation.

In still further embodiments information of poses may be included in the respective point cloud, so that a comparison is made between selections of the respective point cloud based on a particular pose. Adding a pose estimation to the extraction of a feature vector may be readily effected, and there are several pose estimation algorithms available. Still, an alternative could be to use a feature vector that includes a parameter indicating a pose estimation. In an example, frontal views of an individual rather than rear views or profile views are given a higher weight compared to other views, ranging from a slightly higher weight to a full discrimination of other views. In other embodiments other views are rated higher instead.

Notably, the preferred pose may vary, and as a simplistic example one may consider a situation where an individual carries a bright red rucksack, in which case a feature vector from a rear view may be more indicative than a frontal view. This leads to a further beneficial effect of the recording of a point cloud: It is readily possible to evaluate different portions of the point cloud separate from others (such as the examples relating to occlusion periods or poses). More particularly the invention enables that a particularly characteristic or well-defined portion of the point cloud is selected. To further detail this embodiment, and as an example in a group of embodiments, there may be a cluster of individual feature vectors that are particularly close to each other in their assembled point cloud, and by analysing the point cloud it is possible both to find the cluster and to analyse the feature vectors of the cluster. Since "close to each other" may be construed as somewhat relative, an example could be that a concentration of feature vectors is higher than in other portions of the point cloud. For the above example the cluster could correspond to views including the bright red rucksack, while it could equally well correspond to views including a particular pose proving to be particularly characteristic for a particular individual. This information may be useful when an individual is to be identified following a disappearance (be it a short-term occlusion or a disappearance for a longer period of time), since the first (or second, etc.) tracking may result in the identification of the most promising portion of the point cloud.

Figure 5:
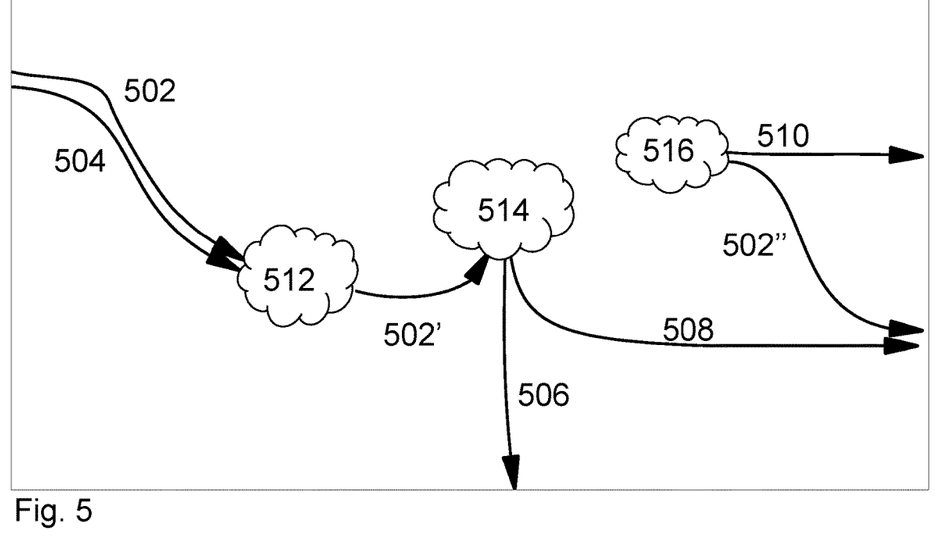
FIG. 5 is a view similar to FIG. 1, yet as an even more schematic view, illustrating a number of tracklets and occlusions of an individual scene.

FIG. 5 illustrates a scene including moving objects, yet in an even more schematic layout than the illustration of FIG. 1. Each arrow 502, 504, 506, 508, and 510 corresponds to the track of an object (not shown) as detected by a tracking algorithm, and the partial tracks 502-510 are sometimes referred to as tracklets. Each schematic shrubbery 512, 514, 516 in FIG. 5 corresponds to a position where objects disappear or gets occluded, or indeed appears. The leftmost shrubbery 512 could correspond to a tree or a car, while the other two shrubberies 514, 516 could correspond to the entrances of a building. The shrubberies 512, 514, 516 could also represent a group of people, resulting in full or partial occlusion during a longer or shorter period of time. There are of course other common situations where occlusions occur, such as when two individuals meet so that they overlap in the camera field of view. In total, there are 7 tracklets in FIG. 5, and by using the inventive method it will be possible to associate detected objects and tracklets representing an individual entering from the left, being temporarily occluded by the shrubbery 512, entering into the shrubbery 514 and appearing from the shrubbery 516 before leaving the scene, regardless of the occlusions being short-term or long-term. In the illustrated embodiment this may correspond to the tracklets 502, 502', and 502" all associated With the same object. During the tracking the invention may be applied in one or more of the manners as described in the present application, where the most decisive parameter may be the occlusion period.

In some installations there are multiple cameras, and the camera imaging the scene of FIG. 5 may be surrounded by additional cameras, illustrated by the views of cameras 1-4 shown in the scenes of FIGS. 6a-6d. By using the present invention, it may be possible to re-identify the object leaving the view of FIG. 5 via the tracklet 502" as being the same as the object entering the view of camera 2 (in FIG. 6b) according to tracklet 602h. Following the first re-identification the same object may then be found to reappear in FIGS. 6c (as 602c) and 6d (as 602d). The other tracklets (604 in FIG. 6a, tracklet 606 in FIGS. 6b, and 608 in FIG. 6c) do not correspond to the object 102.

Figure 6A:
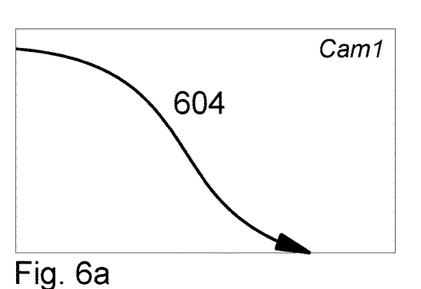
FIGS. 6a-6d are a number of views illustrating an embodiment of the invention applied for tracking over several cameras.
Figure 6B:
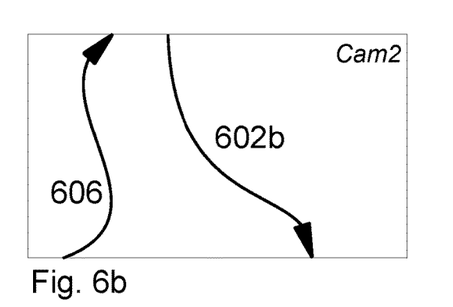
Figure 6C:
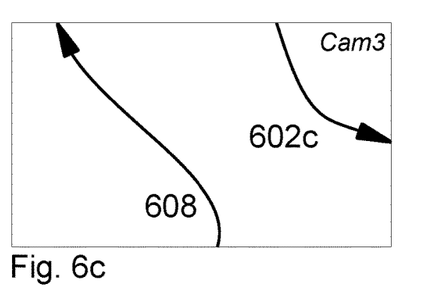
Figure 6D:
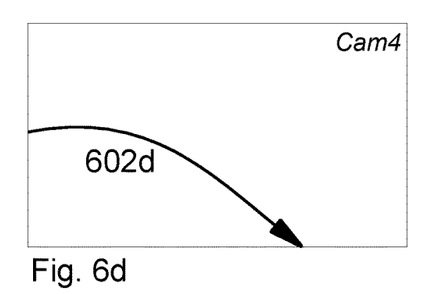

For the purpose of further highlighting an advantage of the present invention of using the point cloud of feature vectors we can linger a bit longer on FIGS. 6b, 6c, and 6d. Consider also that the object in question is an individual, and that the camera offers a view from the side, slightly from above. Looking at the tracklet 602b it is likely that there is a lot of frontal views of the individual, provided that the camera surveilles the scene from the side or from a slightly elevated position and that the individual is turned in the direction of the tracklet in each position thereof. This means that feature vectors relating to frontal views will be well represented and in abundance. On the other hand, the tracklet 602c of FIG. 6c indicates that frontal views as well as sideviews will be acquired (if the camera acquiring the images are configured as described in relation to FIG. 6b), assuming again that the individual is directed in the direction of the tracklet. By use of the present invention a tracking method may e.g. enhance the importance of feature vectors representing the frontal views, so as to facilitate the re-identification. Once re-identification is performed, the feature vectors extracted from the tracklet 602c may be added to the rest for the associated object. This results in that when re-identifying the same object in FIG. 6d, the importance of the sideviews may be enhanced in the corresponding way when comparing the point clouds. This corresponds to making a selection in among the feature vector assembled in the point cloud for a first tracklet (e.g. tracklet 602c) and a corresponding selection in the point cloud for a second tracklet (e.g. tracklet 602d).

Figure 7:
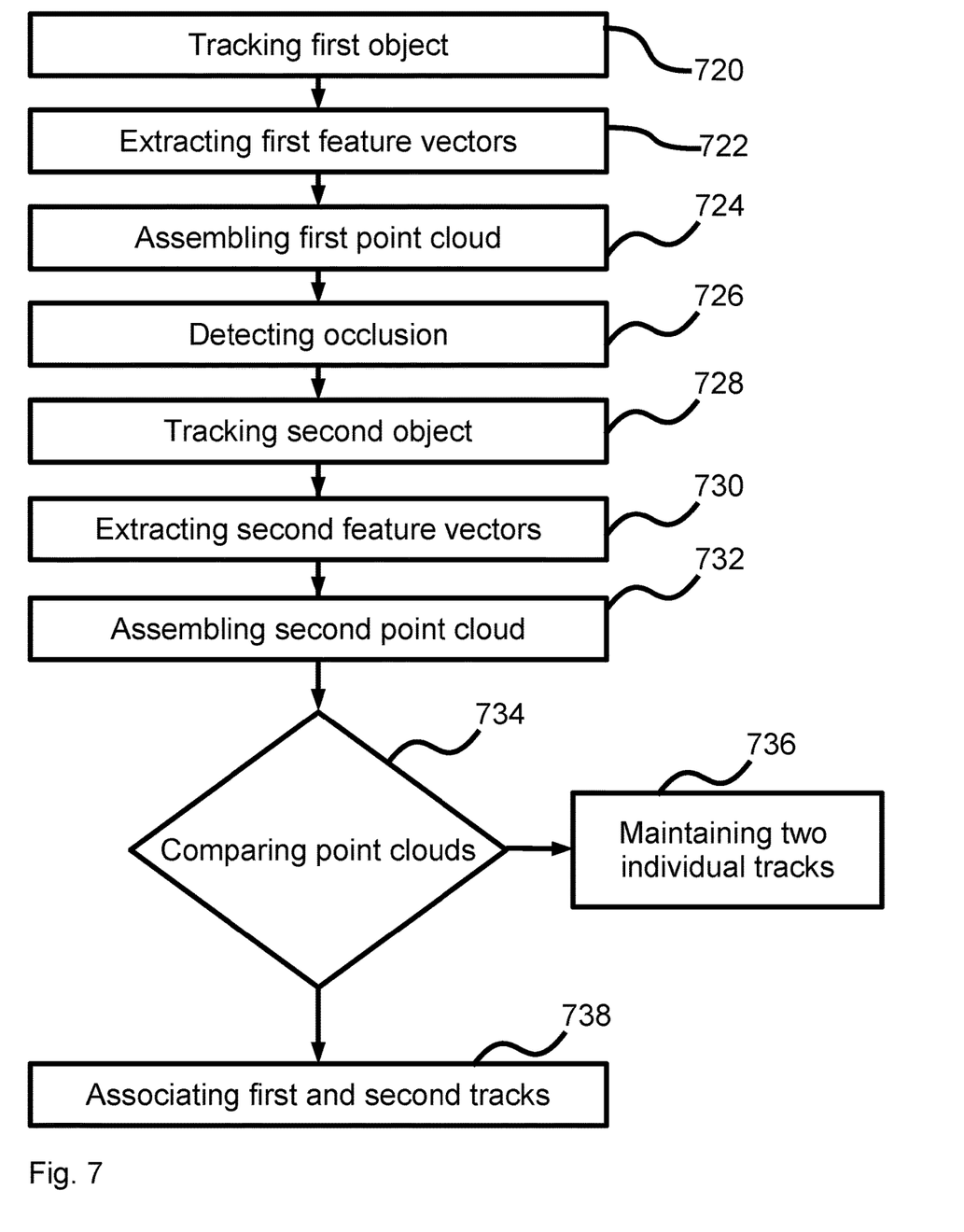
FIG. 7 is a flowchart illustrating an embodiment of the present invention.

FIG. 7 illustrates a flowchart of a method according to an embodiment of the present invention. The flowchart is readily correlated with the description of FIGS. 1-6, yet in short it describes the method as comprising:

Detecting a first object in a scene, tracking 720 the first object over a first sequence of image frames, extracting 722 feature data in the form of multiple first feature vectors for the first object, assembling 724 the multiple first feature vectors as a first point cloud in a feature vector space, and detecting 726 an occlusion of the first object. The method continues with detecting a second object subsequently appearing in a scene, tracking 728 the second object over a second sequence of image frames, extracting 730 data in the form of multiple second feature vectors for the second object, assembling 732 the multiple second feature vectors as a second point cloud in the feature vector space. In a final part of the method a selected portion of the first point cloud is compared 734 to at least a selected portion of the second point cloud in the point cloud space, and the outcome of the comparison is used to deduce if the first object and the second object may be considered to be the same object and, if so, the first object is associated 738 with the second object, and their respective tracklet is associated with each other. If the objects are deemed not to be the same, the two tracks/objects are maintained 736 as separate tracks/objects or tracklets.

It will be appreciated that a person skilled in the art can modify the above described embodiments in many ways and still use the advantages of the invention as shown in the embodiments above.

Additionally, variations to the disclosed variants can be understood and effected by the skilled person in practicing the claimed invention, from a study of the drawings, the disclosure, and the appended claims.

The invention claimed is:

1. A method for tracking an object in video-monitoring scenes using computer vision, the method comprising
   detecting a first object in a scene,
   tracking the first object over a first sequence of image frames,
   extracting data in the form of multiple first feature vectors for the first object,
   assembling the multiple first feature vectors as a first point cloud in a feature vector space,
   detecting an occlusion of the first object,
   detecting a second object subsequently appearing in a scene,
   tracking the second object over a second sequence of image frames,
   extracting data in the form of multiple second feature vectors for the second object,
   assembling the multiple second feature vectors as a second point cloud in the feature vector space,
   comparing at least a first selected portion of the first point cloud to at least a second selected portion of the second point cloud in the point cloud space, wherein one or both of the first selection portion and the second selection portion is based on a length of an occlusion period that is a time between the occlusion of the first object and the appearance of the second object, and
   on condition that the comparing the first object and the second object indicates the first object and the second object are the same object, enabling a track recovery where an object identity of the second object is set to the object identity of the first object, or vice versa.

2. The method of claim 1, wherein an application of a distribution of weights to each individual feature vector in the selection is also based on the occlusion period.

3. The method of claim 2, wherein shorter occlusion periods shift higher weights to feature vectors extracted closer to the occlusion period, compared to longer occlusion periods.

4. The method of claim 1, wherein the one or both selections of portion to be used for comparison is based, fully or partly, on an estimated pose of the first and/or second tracked object.

5. The method of claim 1, wherein the one or more selections of portion to be used for comparison is made from a parameter selected from, in an image area of the first or second object: a level of motion blur, a level of signal to noise ratio, the lighting conditions, and a viewing angle of the tracked object or combinations thereof.

6. The method of claim 1, comprising applying statistical weights to feature vectors in the first and/or second point cloud during the comparison, wherein the statistical weights are fully or partly based on an estimated pose of the first and/or second tracked object, so as to emphasize certain poses.

7. The method of claim 1, further comprising evaluation of the first and/or second point cloud so as to identify a portion of the point cloud having a particularly dense concentration of feature vectors.

8. The method of claim 1, wherein a Euclidian distance is used when comparing the first point cloud to the second point cloud.

9. The method of claim 1, wherein the first point cloud is compared to the second point cloud in a manifold where a major portion of the first point cloud and the second point cloud resides.

10. The method of claim 1, wherein the first point cloud is acquired using a first monitoring camera, whereas the second point cloud is acquired using a second monitoring camera.

11. A device for performing the method of claim 1, wherein the device comprises at least one video-imaging unit for acquiring video image frames of a scene, and a control unit configured to perform the steps of the method.

12. The device of claim 11, Wherein the device is a video monitoring camera.

13. A system comprising multiple devices according to claim 11, wherein the control unit is a control unit of one of the video monitoring cameras, or wherein the control unit is a centralized control unit located as a separate device, on a server, or on a client device remote from the video monitoring cameras.

14. The method of claim 1, further comprising:
   applying a distribution of weights to each individual feature vector in the selection is based on the occlusion period includes either
   shifting higher weights to feature vectors extracted closer to the occlusion periods in shorter occlusion periods as compared to longer occlusion periods, or shifting higher weights towards specific portions of the point cloud corresponding to specific poses of the tracked object.

15. A non-transitory computer-readable medium comprising instructions which, when executed by a computer, cause the computer to carry out the method according to claim 1.

* * * * *